United States Patent
Dembla et al.

(10) Patent No.: US 10,210,238 B2
(45) Date of Patent: *Feb. 19, 2019

(54) CONTINUOUS AUTOMATIC UPDATE STATISTICS EVALUATION USING CHANGE DATA CAPTURE TECHNIQUES

(71) Applicant: International Business Machines Corporation, Armonk, NY (US)

(72) Inventors: Nita Dembla, Alpharetta, GA (US); Marco Greco, Feltham (GB); Bingjie Miao, Englewood, CO (US)

(73) Assignee: International Business Machines Corporation, Armonk, NY (US)

(*) Notice: Subject to any disclaimer, the term of this patent is extended or adjusted under 35 U.S.C. 154(b) by 23 days.

This patent is subject to a terminal disclaimer.

(21) Appl. No.: 15/467,743

(22) Filed: Mar. 23, 2017

(65) Prior Publication Data

US 2017/0249342 A1     Aug. 31, 2017

Related U.S. Application Data

(63) Continuation of application No. 15/055,692, filed on Feb. 29, 2016.

(51) Int. Cl.
    *G06F 17/30* (2006.01)
(52) U.S. Cl.
    CPC .. *G06F 17/30598* (2013.01); *G06F 17/30306* (2013.01); *G06F 17/30339* (2013.01); *G06F 17/30345* (2013.01); *G06F 17/30442* (2013.01)

(58) Field of Classification Search
    CPC ......... G06F 17/30598; G06F 17/30306; G06F 17/30339; G06F 17/30442; G06F 17/30345
    See application file for complete search history.

(56) References Cited

U.S. PATENT DOCUMENTS 7,756,740 B2   7/2010   Lambert et al.
8,510,270 B2   8/2013   Pareek et al.
(Continued)

FOREIGN PATENT DOCUMENTS

WO   2014077807 A1   5/2014

OTHER PUBLICATIONS

List of IBM Patents or Patent Applications Treated as Related.
(Continued)

*Primary Examiner* — Leslie Wong
(74) *Attorney, Agent, or Firm* — North Shore Patents, P.C.; Michele Liu Baillie

(57) ABSTRACT

In a method for table statistics update, in response to a request to modify a row in a target table, a database management system inspects a log record for the modified row in the target table, determines that the target table is configured for continuous statistics evaluation, and determines whether a mini-bin related to the modified row exists. When the mini-bin related to the modified row does not exist, the database management system creates the mini-bin. When the mini-bin related to the modified row exists, the database management system aggregates the modified row into the mini-bin, and when the mini-bin is determined to have reached a threshold size, stores the mini-bin to a disk. The database management system then consolidates a plurality of mini-bins stored in the disk and corresponding to the target table into a set of bins.

7 Claims, 8 Drawing Sheets

(56) References Cited

U.S. PATENT DOCUMENTS

| | | | |
|---|---|---|---|
| 8,688,622 B2 | 4/2014 | Willson | |
| 8,868,573 B2 | 10/2014 | Chu et al. | |
| 8,965,839 B2* | 2/2015 | Kittock | G06F 17/30312 |
| | | | 707/603 |
| 9,081,843 B2 | 7/2015 | Leshchiner | |
| 9,679,011 B2* | 6/2017 | Dixit | G06F 17/30421 |
| 9,892,148 B2* | 2/2018 | Heman | G06F 17/30345 |
| 2009/0307287 A1* | 12/2009 | Barsness | G06F 17/30501 |
| 2009/0307290 A1* | 12/2009 | Barsness | G06F 17/30575 |
| 2010/0191884 A1* | 7/2010 | Holenstein | G06F 11/2094 |
| | | | 710/200 |
| 2012/0036146 A1* | 2/2012 | Annapragada | G06F 17/30545 |
| | | | 707/764 |
| 2013/0346364 A1* | 12/2013 | Ahluwalia | G06F 17/30339 |
| | | | 707/610 |
| 2014/0074853 A1 | 3/2014 | Nath | |
| 2014/0196055 A1 | 7/2014 | Hu et al. | |
| 2015/0032694 A1* | 1/2015 | Rajamani | G06F 17/30581 |
| | | | 707/625 |
| 2015/0074062 A1 | 3/2015 | Krein et al. | |
| 2015/0149405 A1* | 5/2015 | Pathak | G06F 17/30463 |
| | | | 707/609 |
| 2015/0242476 A1 | 8/2015 | Bender | |
| 2015/0261840 A1* | 9/2015 | Clifford | G06F 17/30454 |
| | | | 707/807 |
| 2015/0277802 A1* | 10/2015 | Oikarinen | G06F 3/0631 |
| | | | 711/114 |
| 2015/0379008 A1* | 12/2015 | Reiss | G06F 17/30501 |
| | | | 707/693 |
| 2017/0097873 A1* | 4/2017 | Krishnamachari | G06F 3/0604 |
| 2017/0116230 A1* | 4/2017 | Zait | G06F 17/30469 |

OTHER PUBLICATIONS

Dembla, Nita; "Take advantage of fragment-level statistics and smarter statistics in IBM informix"; Apr. 21, 2011.

Miller, John F. III; "Unlocking the Mysteries of Update Statistics & the Explain File"; May 10, 2006; Tampa Florida.

* cited by examiner

CONTINUOUS AUTOMATIC UPDATE STATISTICS EVALUATION USING CHANGE DATA CAPTURE TECHNIQUES

BACKGROUND

Most relational database management systems (RDBMSs), as part of their functionality, collect statistics about tables, either automatically or under instruction from database administrators (DBAs). These statistics are used by the query optimizer to select the most appropriate execution plan when these tables are being queried. Given the cost based nature of modern optimizers, up to date table statistics are vital for the selection of the most appropriate plan.

One of the most important statistics gathered are data distributions. Data distributions describe to the optimizer the distribution of rows across distinct values of a specific column. When data distributions are not available, the optimizer typically assumes uniform distribution of distinct values across all rows. However data is seldom uniformly distributed, and when query predicates contain specific constant values for a given column, optimizers can select more appropriate query plans if the knowledge is available that a particular value appears in a larger or smaller proportion of the rows.

Data distributions are generally represented as a list of "bins", each bin tracking a fixed fraction of rows in a table. The number of bins and the amount of rows tracked depends on the resolution used to create the distributions. When arranged contiguously, the bins form a histogram of the distribution of the data. Collecting distributions can be a very costly operation, as it implies a whole scan of the table and subsequent sorting of data values, as a result of which, DBAs are challenged to strike the right balance between collecting statistics often enough for the optimizer to select the correct plans at all times, and not so often as to overload the system. For example, for very large tables, such as those with a terabyte or more, histogram gathering may last several hours.

Once the distributions are acquired, depending on the pattern of Data Manipulation Language (DML) operations altering the contents of the tables, a substantial amount of DML operations may be needed before the difference in the actual data and the data distribution known to the optimizer is such that the optimizer chooses a suboptimal execution plan. Assuming a random distribution of values being modified, each individual distribution bin will have a slightly skewed distribution of data as compared to the actual data. However, the differences are likely not significant, and the distributions will convey a good enough representation of the data presently in the table for the optimizer to still select an appropriate execution plan. Thus, for a random distribution of values being modified, DBA's can gauge the type of interval between statistics collections that would affect the optimizer's plan selection and set the statistics collections seldom enough to not burden the system.

However, when the DML operation distribution is not random, i.e., the pattern of insertion and deletion of data is predictable, the differences in the distributions will affect the optimizer's plan selections. Example scenarios include journals or queues, where typically the data grow with time, and in the case of queues, the data is removed when expired. These tables normally have columns with ever increasing individual ID's and/or timestamps. Other non-random data manipulation scenarios are possible, such as data being inserted at either end of the table, or data being deleted from the higher end and inserted at the lower end of the table. In these circumstances, distribution information for the individual ID's or timestamps columns is almost certainly correct for a specific fraction of the data. When asked to select an execution plan within this fraction of the data, the optimizer will choose an appropriate plan.

However, the optimizer has no knowledge of any data inserted after the last time statistics were collected, and, conversely, it may incorrectly assume that older data still exists. Over time, new data values may be significantly higher than the highest distribution bin and old data values may carve well into the lower distribution bins. For any query that tries to access data for which there is no distribution information, or for values that fall within the stale distribution bins, the optimizer may select inefficient plans.

SUMMARY

Disclosed herein is a method for continuous automatic updating of table statistics in a database system, and a corresponding system and computer program product, as specified in the independent claims. Embodiments of the present invention are given in the dependent claims. Embodiments of the present invention can be freely combined with each other if they are not mutually exclusive.

According to an embodiment, the present invention relates to a method for table statistics update in a database management system. In the method, in response to a request to modify a row in a target table, the database management system inspects a log record for the modified row in the target table. The database management system determines that the target table is configured for continuous statistics evaluation and determines whether a mini-bin related to the modified row exists. The mini-bin represents data distribution for a portion of rows in the target table. A plurality of mini-bins can subsequently be used to construct a distribution bin. A min-bin thus encapsulates data in condensed form while still offer flexibility in the construction of distributions bins with different sizes. In response to determining that the mini-bin related to the modified row does not exist, the database management system creates the mini-bin. In response to determining that the mini-bin related to the modified row exists, the database management system aggregates the modified row into the mini-bin, and when the mini-bin is determined to have reached a threshold size, stores the mini-bin to a disk. The database management system then consolidates a plurality of mini-bins stored in the disk and corresponding to the target table into a set of bins. The set of bins represent data distribution of the target table.

In one aspect of the present invention, in response to determining that the target table is configured for continuous statistics evaluation, the database management system determines whether the request comprises an insert of the row into the target table or a deletion of the row from the target table. In this aspect, the database management system also determines whether a column's data behaves like a journal or queue with data modification.

In one aspect of the present invention, when the request includes the insert of the row into the target table, in aggregating the modified row into the mini-bin, the database management system increments a number of rows tracked in the mini-bin and determines whether a column related to the insert includes a unique constraint. In response to determining that the column includes the unique constraint, the database management system increments a number of unique values tracked in the mini-bin. When an inserted value is higher than a maximum value tracked in the mini-bin, the database management system sets the maximum value tracked to the inserted value. When the inserted value is lower than a minimum value tracked in the mini-bin, the database management system sets the minimum value tracked to the inserted value.

In one aspect of the present invention, when the request includes the deletion of the row from the target table, in aggregating of the modified row into the mini-bin, the database management system decrements a number of rows tracked in the mini-bin and determines whether a column related to the deletion includes a unique constraint. In response to determining that the column includes the unique constraint, the database management system decrements a number of unique values tracked in the mini-bin and determines whether a type of the column is integer and values tracked in the mini-bin are contiguous and wholly contained between a minimum value and a maximum value tracked in the mini-bin. In response to determining that the type of the column is integer and the values tracked in the mini-bin are contiguous and wholly contained between the minimum value and the maximum value tracked in the mini-bin, the database management system determines whether a value of the deletion equals the maximum value tracked in the mini-bin or equals the minimum value tracked in the mini-bin. In response to determining that the value of the deletion equals the maximum value tracked in the mini-bin, the database management system decrements the maximum value tracked in the mini-bin, and in response to determining that the value of the deletion equals the minimum value tracked in the mini-bin, increments the minimum value tracked in the mini-bin.

In one aspect of the present invention, when the request includes the deletion of the row from the target table, and when a size of the mini-bin is determined to have reached zero, the database management system deletes the mini-bin from a system catalog.

System and computer program products corresponding to the above-summarized methods are also described and claimed herein.

DETAILED DESCRIPTION

Embodiments of the present invention provide continuous automatic updating of table statistics for non-random manipulations of data in a database system using change data capture techniques. Illustrative embodiments create mini-bins dynamically by collecting data as it is inserted into a target table, and conversely, destroying mini-bins as the data is deleted and the mini-bin becomes empty. Illustrative embodiments automatically (i.e., without user intervention) creates new up-to-date distributions as soon as a new mini-bin is formed or when an old mini-bin becomes empty.

Figure 1:
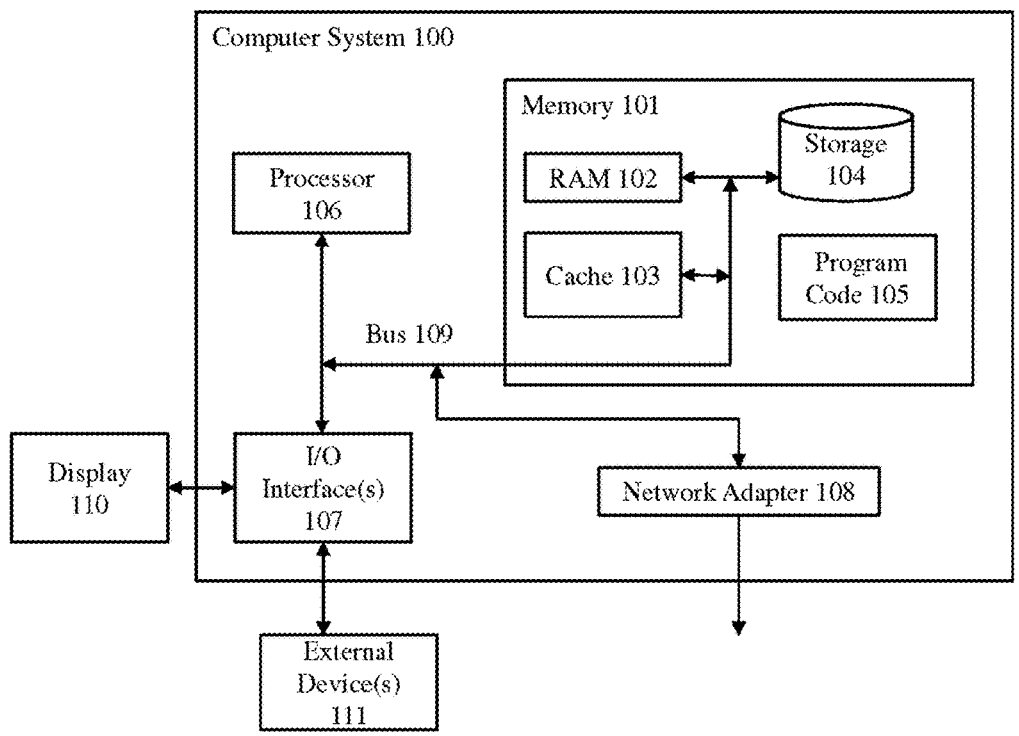
FIG. 1 illustrates a computer system for continuous automatic updating of table statistics in a database system according to embodiments of the present invention.

FIG. 1 illustrates a computer system for continuous automatic updating of table statistics in a database system according to embodiments of the present invention. The computer system 100 is operationally coupled to a processor or processing units 106, a memory 101, and a bus 109 that couples various system components, including the memory 101 to the processor 106. The bus 109 represents one or more of any of several types of bus structure, including a memory bus or memory controller, a peripheral bus, an accelerated graphics port, and a processor or local bus using any of a variety of bus architectures. The memory 101 may include computer readable media in the form of volatile memory, such as random access memory (RAM) 102 or cache memory 103, or non-volatile storage media 104. The memory 101 may include at least one program product having a set of at least one program code module 105 that are configured to carry out the functions of embodiment of the present invention when executed by the processor 106. The computer system 100 may also communicate with one or more external devices 111, such as a display 110, via 110 interfaces 107. The computer system 100 may communicate with one or more networks via network adapter 108.

Figure 2:
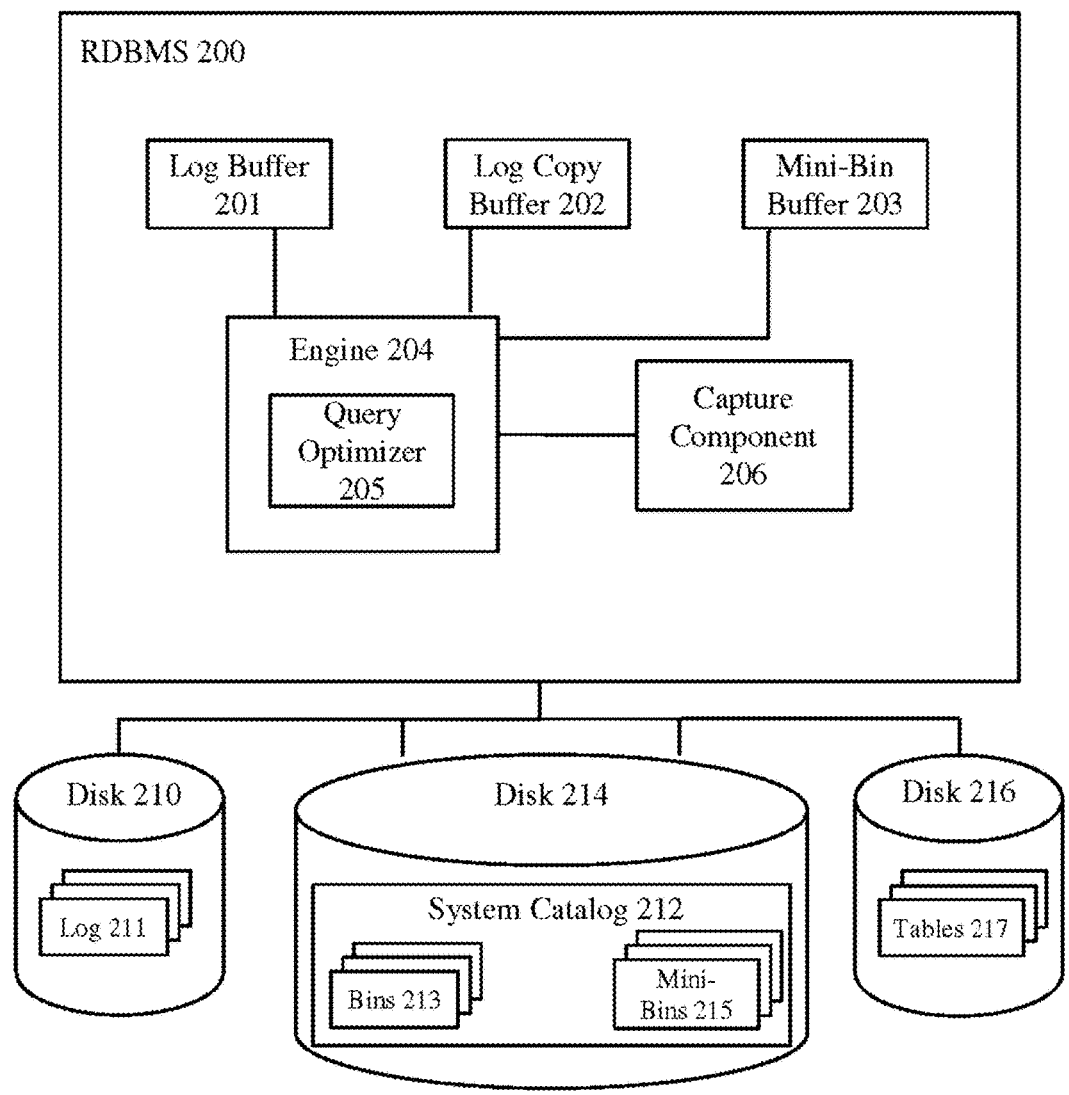
FIG. 2 illustrates functional components of a relational database management system for continuous automatic updating of table statistics according to embodiments of the present invention.

FIG. 2 illustrates functional components of a relational database management system (RDBMS), implemented by the computer system 100, for continuous automatic updating of table statistics according to embodiments of the present invention. The RDBMS 200 includes a log buffer 201 for storing log records, a log copy buffer 202 for storing copies of log records, and a mini-bin buffer 203 for storing current mini-bins. The RDBMS 200 further includes an engine 204, which processes queries. Within the engine 204 is a query optimizer 205 which selects the query plan for the queries. The RDBMS 200 further includes a capture component 206 implementing change data capture (CDC) techniques. The RDBMS 200 further includes a disk 210 for persistently storing log records 211, a disk 214 for persistently storing formed bins 213 and mini-bins 215 in the system catalog 212, and a disk 216 for persistently storing the tables 217 of the database.

Figure 8:
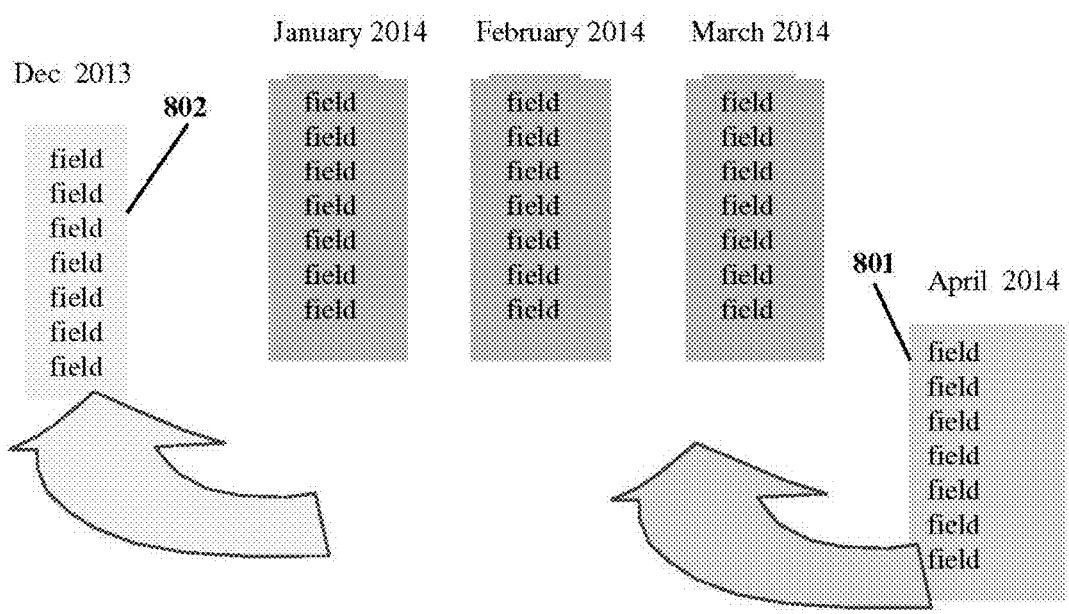
FIG. 8 illustrates an example of non-random modification of data that includes time-cyclic data management where there is data for different time periods.

Distribution statistics for tables are collected and stored in the system catalogs 212, which the optimizer 205 uses to determine the lowest-cost query plan. Distribution statistics provide the optimizer 205 with information about the frequency and the distribution of data. The updating of the table statistics is necessary for the optimizer 205 to accurately assess the execution cost of query plans. One technique for statistics collection is fragment-level statistics (FLS). With FLS, a table is partitioned into fragments. FLS allows the storage of column data distributions per fragment, and building the table level statistics from its constituent fragments. Fragment level column statistics are represented as mini-bins 215, with each mini-bin being a small percentage of the final column bin 213. Data from each fragment are individually sorted, and the mini-bin distributions are built and stored in the system catalog 212. Table level statistics are built by merging the relevant fragment statistics in the mini-bins 215, represented as a bin 213. Thus, a plurality of mini-bins can subsequently be used to construct a distribution bin 213. A mini-bin 215 encapsulates data in condensed form while still offers flexibility in the construction of a distribution bin 213 with different sizes. In illustrative embodiments described below, the underlying mechanism for statistics collection is the CDC, implemented by the capture component 206, where the CDC keeps track and acts upon non-random modifications of data (i.e., predictable patterns of insertion and/or deletion of data). As illustrated in FIG. 8, an example of non-random modification of data includes time-cyclic data management, where there is data for different time periods. Data for each time period is stored in distinct fragments. Inserted data are "rolled in" to a new fragment 801 (i.e., attach the new fragment) and deleted data are "rolled out" from an existing fragment 802 (i.e., detach the existing fragment). Other non-random data manipulation scenarios may also apply.

Figure 3:
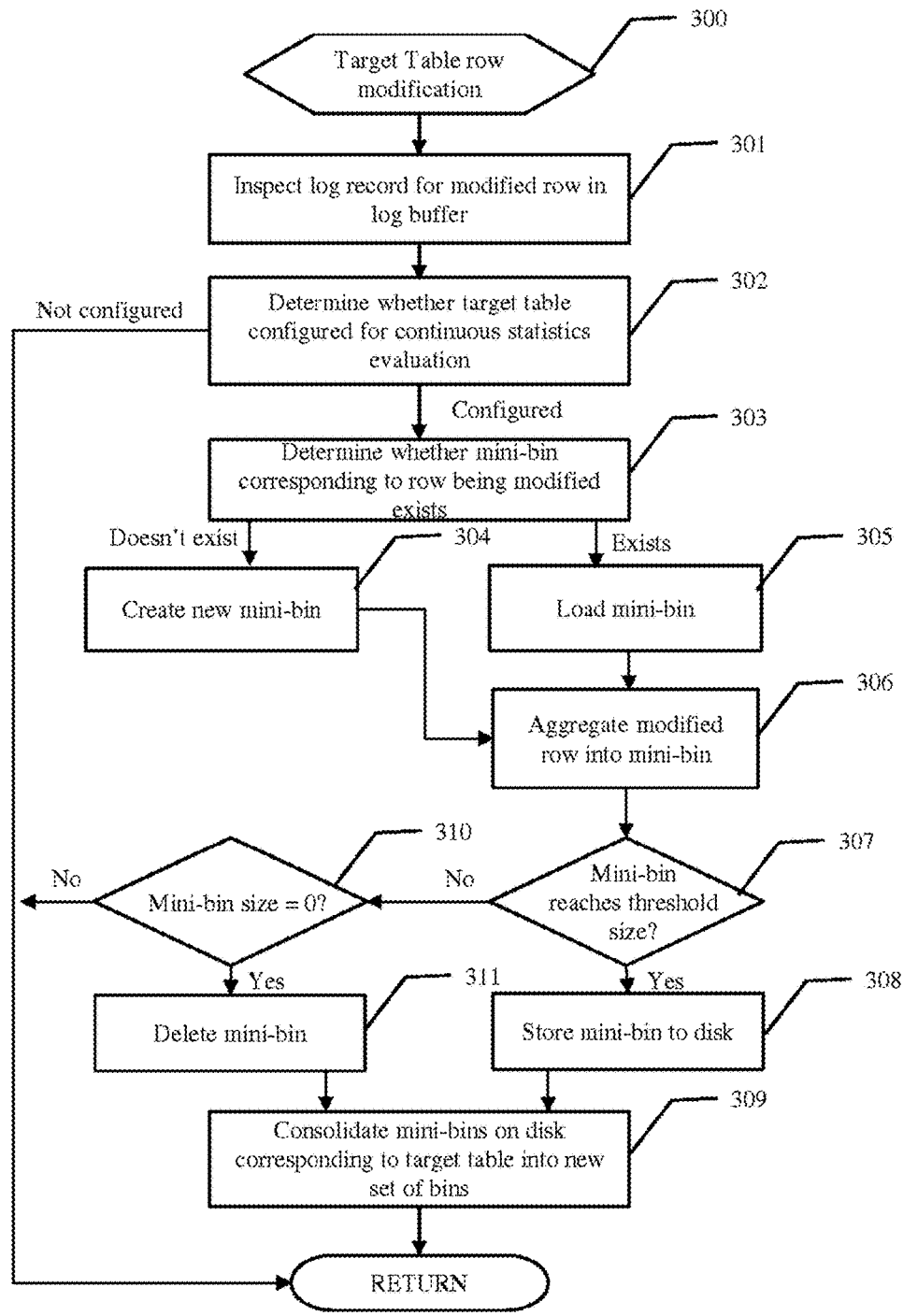
FIG. 3 is a flowchart illustrating a method for continuous automatic updating of table statistics in a database system according to embodiments of the present invention.

FIG. 3 is a flowchart illustrating a method for continuous automatic updating of table statistics in a database system according to embodiments of the present invention. When the engine 204 performs a target table row modification (300), a log record for the row modification is created and stored in the log buffer 201. A table row modification includes a row insert, a row delete, or a row update. A row update may be viewed as a combination of a row delete and a row insert. The engine 204 inspects the log record for the modified row in the log buffer 201 (301) and determines whether the target table is configured for continuous statistics evaluation (302). IN this exemplary embodiment, any target table marked with continuous statistics update has mini-bin level distributions. When the target table is configured for continuous statistics evaluation, the engine 204 determines whether a mini-bin corresponding to the row being modified exists (303). When the mini-bin does not exist, a new mini-bin is created (304). When the mini-bin does exist, the mini-bin is loaded into the mini-bin buffer 203, if necessary (305). The engine 204 aggregates the modified row into the mini-bin (306). The engine 204 checks whether the mini-bin has reached a threshold size (307). If the mini-bin has reached the threshold size, then the mini-bin is stored to disk 214 (308), along with the other mini-bins 215. If the mini-bin size has not reached the threshold size and its size is zero (310), then the mini-bin is deleted (311). When the mini-bin is either stored to disk (308) or deleted (311), the mini-bins 215 stored on the disk 214 that correspond to the target table are consolidated into a new set of distributions or bins (309). The bins are stored in the system catalog 212, and the optimizer 205 can then access the bins in the system catalog 212. In this manner, mini-bins are created and destroyed dynamically. Updated distributions are made available to the optimizer 205 as soon as there are sufficient changes to data to produce distributions that would be different from those on disk, i.e., when a mini-bin reaches the threshold size or when an existing mini-bin becomes empty. With the illustrative embodiments, there is no need to repartition the data, to schedule update statistics commands to run frequently, to run scans in order to update the distributions, or to delete data from the same fragment or insert new data into new fragments.

In the illustrative embodiments, CDC techniques are used, which may be implemented in a variety of ways by the capture component 206. One way is to implement CDC by creating triggers on relevant tables. As data manipulation language (DML) statements execute, the engine 204 will execute triggers defined on the table and execute procedures which have been passed the row being modified. The procedure can then take actions on the row being modified. In another technique, CDC is implemented using log snooping. As part of their functionality, RDBMs have transaction log records which can be used to rollback transactions in case of errors or when directed by users, and more importantly, replay transactions in order to restore a system to the latest known consistent point in case of a catastrophic failure. Log records carry information about rows subject to DML operations and may be used as a source of CDC functionality. With log snooping, individual log records are inspected to see if it pertains to tables on which CDC functionality is required, and if so, are passed to CDC threads to perform associated actions. In yet another technique, which works well for row inserts, code hooks for CDC may be provided, where the language layer calls the storage layer for the purpose of inserting, updating, or deleting individual rows. As the calls to the storage layer are made, copies of the row can be passed to CDC threads. Whichever technique is used for implementing CDC, in the illustrative embodiments of the present invention, specific CDC threads perform specific functions, as described below.

Figure 4:
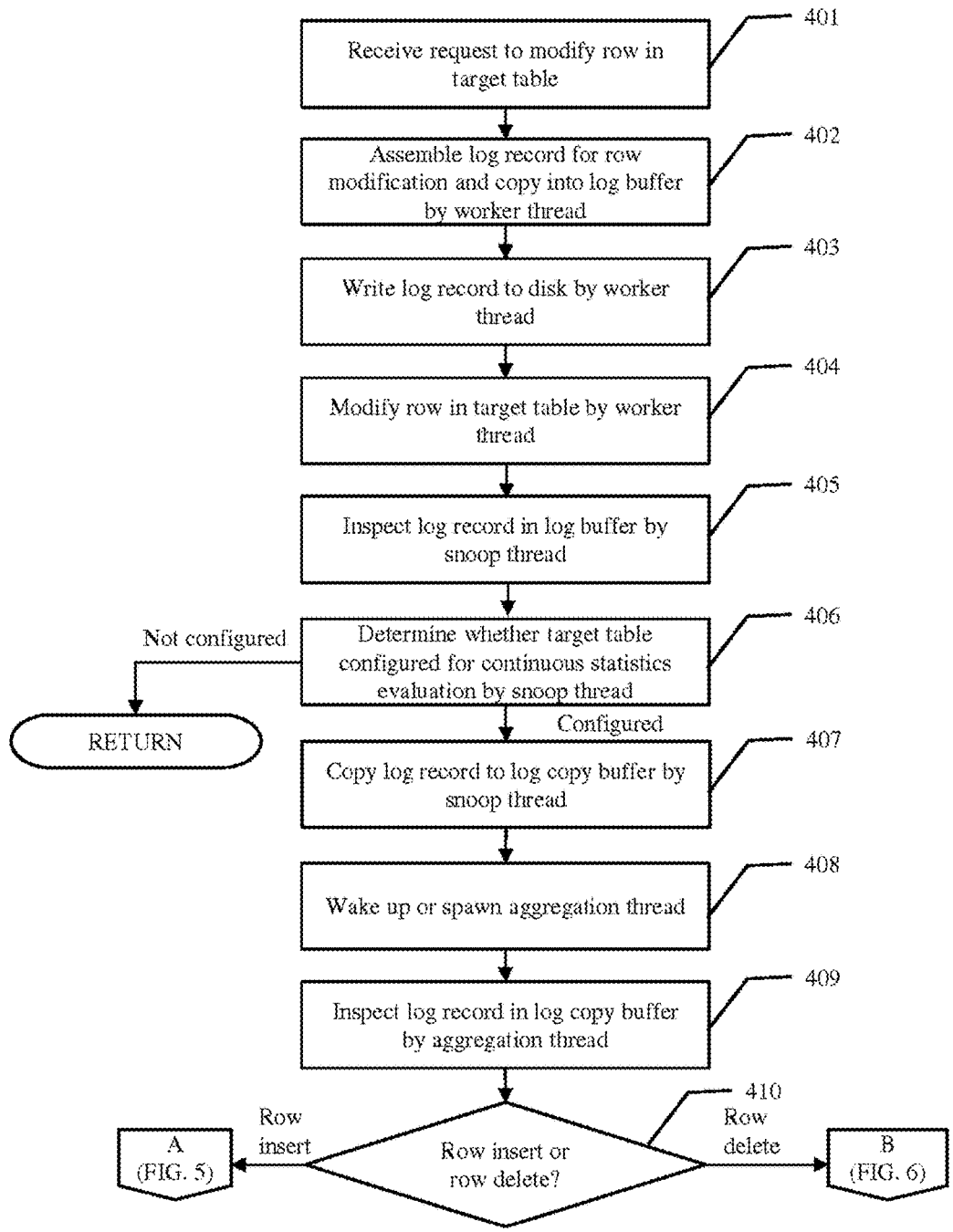
FIGS. 4-7 are flowcharts illustrating in more detail a method for continuous automatic updating of table statistics in a database system according to embodiments of the present invention.

FIGS. 4-7 are flowcharts illustrating in more detail a method for continuous automatic updating of table statistics in a database system according to embodiments of the present invention. Referring to FIG. 4, the engine 204 receives a request to modify a row in the target table (401). A worker thread assembles a log record for the row modification and copies the log record into the log buffer 201 (402). The worker thread writes the log record to disk 210 (403). Once the log record is written to disk, the worker thread modifies the row in the target table per the request (404). After the log record is written to disk and concurrently with the modification of the row, a snoop thread inspects the log record in the log buffer 201 (405) and determines whether the target table is configured for continuous statistics evaluation (406). When the target table is configured for continuous statistics evaluation, the snoop thread copies the log record to the log copy buffer 202 (407). By copying the log record to the log copy buffer 202, the engine 204 may continue processing requests without hindrance from the present invention. The snoop thread then wakes up or spawns an aggregation thread (408). The aggregation thread inspects the log record in the log copy buffer 202 (409), and determines whether the row modification is a row insert or a row delete (410). Here, the aggregation thread further determines whether a column's data behaves like a journal or queue with data modification.

Figure 5:
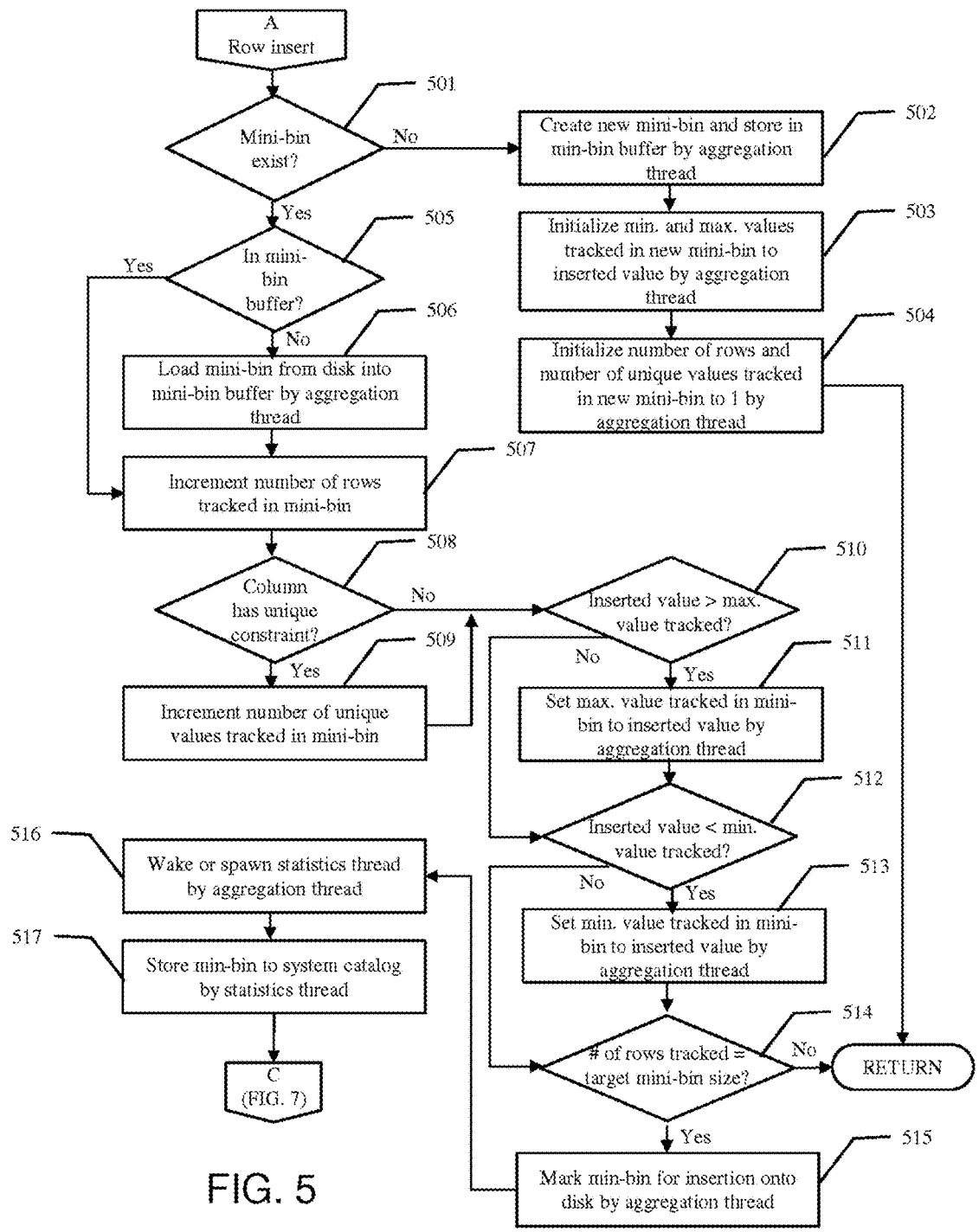

Referring to FIG. 5, when the row modification is a row insert, the aggregation thread determines if a mini-bin corresponding to the row being modified exists (501). If the mini-bin does not exist, the aggregation thread creates a new mini-bin and stores the new mini-bin in the mini-bin buffer 203 (502). The aggregation thread initializes the minimum and maximum values tracked in the new mini-bin to the inserted value (503). The aggregation thread also initializes the number of rows and the number of unique values tracked in the new mini-bin to 1 (one) (504). When the mini-bin exists, the aggregation thread determines whether the mini-bin is in the mini-bin buffer 203 (505). If not, the aggregation thread loads the mini-bin from the disk 214 into the mini-bin buffer 203 (506). The aggregation thread increments the number of rows tracked in the mini-bin (507) and determines whether the column being modified has a unique constraint (508). If the column has a unique constraint, the aggregation thread increments the number of unique values tracked in the mini-bin (509). When the inserted value is higher than the maximum value tracked in the mini-bin (510), the aggregation thread sets the maximum value tracked in the mini-bin to the inserted value (511). When the inserted value is lower than the minimum value tracked in the mini-bin (512), the aggregation thread sets the minimum value tracked in the mini-bin to the inserted value (513). The aggregation thread next determines whether the number of rows tracked in the mini-bin has reached the target mini-bin size (514). When the number of rows tracked has reached the target mini-bin size, the mini-bin is completed or formed, and the aggregation thread marks the mini-bin for insertion onto the disk 214 (515) and wakes or spawn a statistics thread (516). The statistics thread stores the mini-bin into the system catalog 212 (517). The method then continues with FIG. 7.

Figure 6:
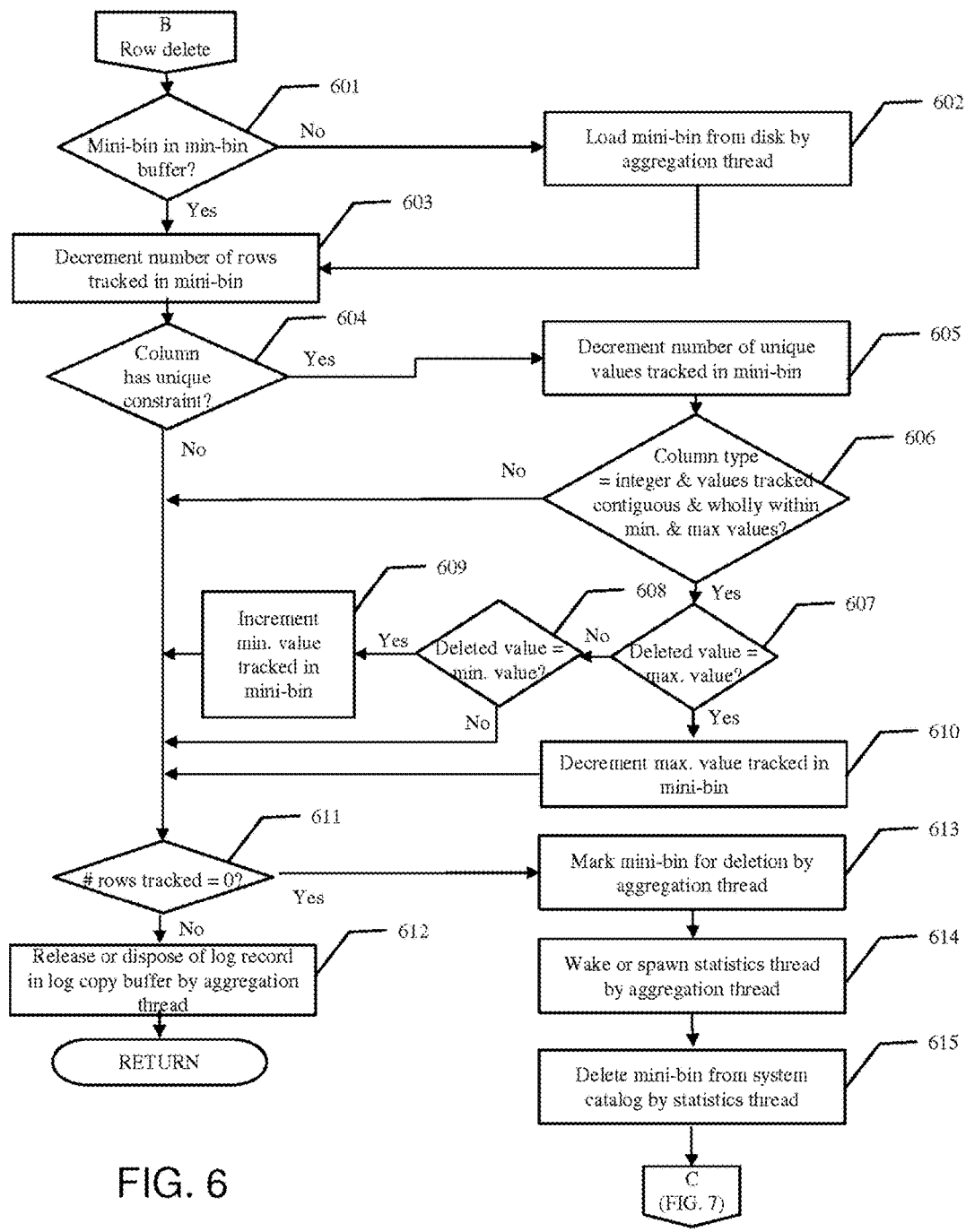

Referring to FIG. 6, when the row modification is a row delete, the aggregation thread determines whether the mini-bin corresponding to the row being deleted is in the mini-bin buffer 203 (601). If not, the aggregation thread loads the mini-bin from the disk 214 into the mini-bin buffer 203 (602). The aggregation thread decrements the number of rows tracked in the mini-bin (603) and determines whether the column has a unique constraint (604). If the column has a unique constraint, the aggregation thread decrements the number of unique values tracked in the mini-bin (605). The aggregation thread determines whether the column type is integer and whether values tracked in the mini-bin are contiguous and wholly contained between the minimum value or the maximum value in the mini-bin (i.e., whether there are as many unique values in the mini-bin as would fit between the minimum and maximum values) (606). If both conditions are true, then the aggregation thread determines whether the deleted value equals the maximum value tracked in the mini-bin (607). When the deleted value equals the maximum value tracked in the mini-bin, the aggregation thread decrements the maximum value tracked in the mini-bin (610). When the deleted value does not equal the maximum value tracked in the mini-bin, the aggregation thread determines whether the deleted value equals the minimum value tracked in the mini-bin (608). When the deleted value equals the minimum value tracked in the mini-bin, aggregation thread increments the minimum value tracked in the mini-bin (609). The aggregation thread next determines whether the number of rows tracked in the mini-bin equals 0 (zero) (611). When the number of rows tracked does not equal 0, the aggregation thread releases or disposes of the log record in the log copy buffer 202 (612). When the number of rows tracked equals 0, the aggregation thread marks the mini-bin for deletion (613) and wakes or spawns a statistics thread (614). The statistics thread deletes the mini-bin from the system catalog (615). The method then continues with FIG. 7.

Figure 7:
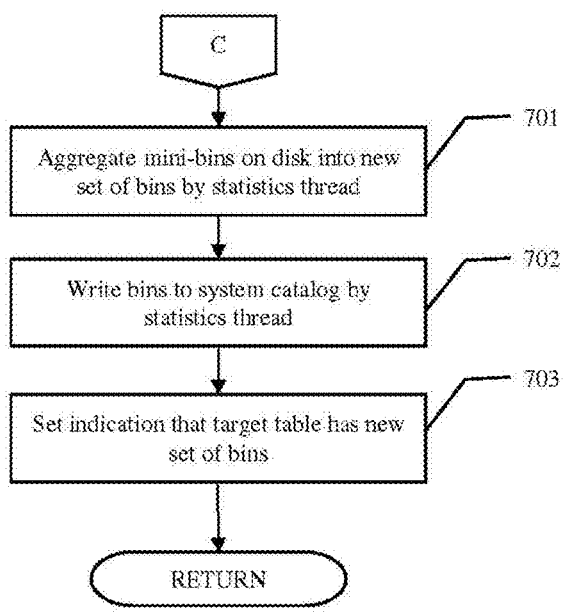

Referring to FIG. 7, from step 515 (FIG. 5) or step 615 (FIG. 6), the statistics thread aggregates the mini-bins 215 from disk 214 into a new set of bins (701), updating the distributions for the target table. The statistics thread writes the new set of bins to the system catalog 212 (702) and sets an indication that the target table has a new set of bins (703). The optimizer 205 can then access the new set of bins from the system catalog 212 and use the new set of bins in selecting the query plan.

Figure 9:
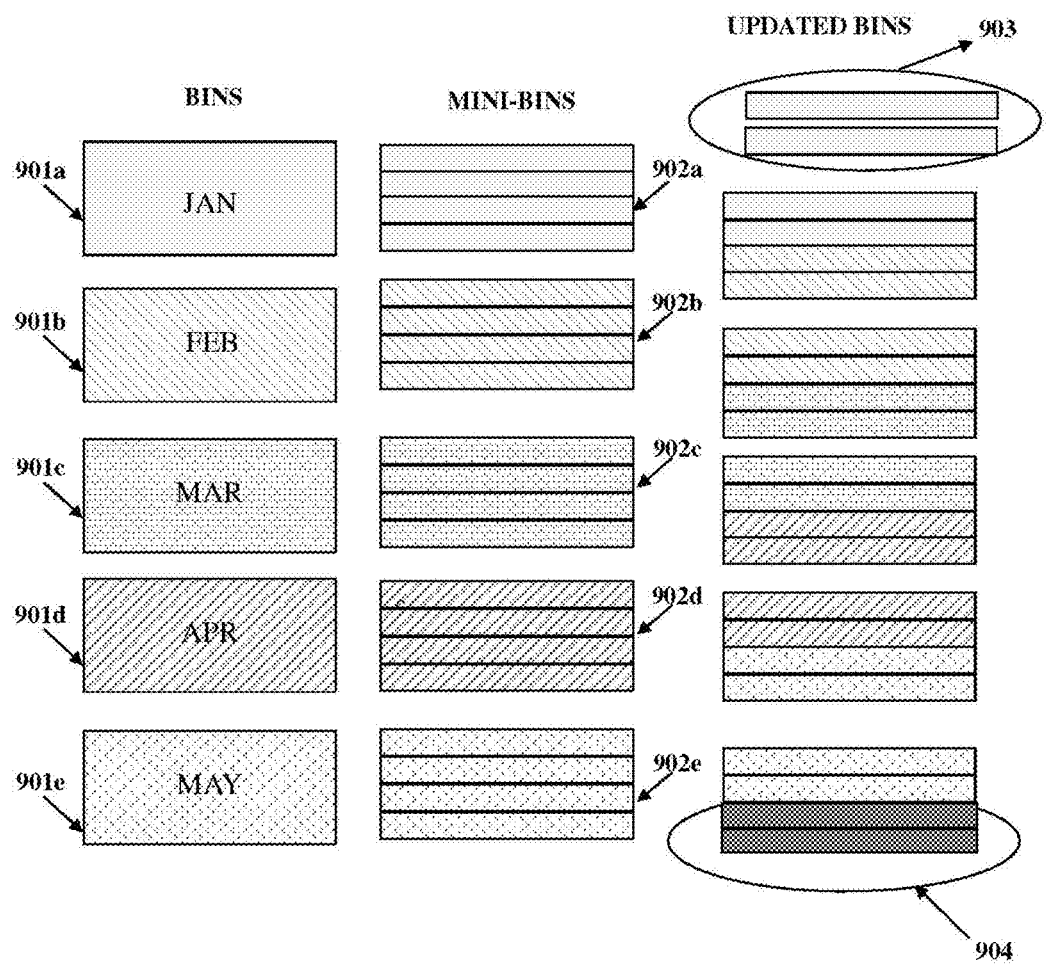
FIG. 9 illustrates an example of updating distributions according to the illustrative embodiments.

Using the time-cycle data example illustrated in FIG. 8, FIG. 9 illustrates an example of updating distributions according to the illustrative embodiments. In this example, assume that bins 901*a*-901*e* exist for each fragment of data corresponding to a particular time period. Each bin 901*a*-901*e* represents a plurality of mini-bins 902*a*-902*e*. As mini-bins 904 reach the threshold size, they are stored as part of mini-bins 902*e*. As mini-bins 903 become empty, they are deleted from mini-bins 902*a*. The updated mini-bins 902*a* and 902*e* are then aggregated to update the distributions represented by bins 901*a* and 901*e*.

In one illustrative embodiment, all tables in the database may be configured for continuous statistics evaluation. Alternatively, continuous statistics evaluation can be enabled only for specific tables and specific columns in order to increase efficiency.

In one illustrative embodiment, a single thread may be used to perform the functions described above. Alternatively, multiple threads may be used to perform multiple tasks. For example, a snoop thread may multiplex the work among multiple mini-bin aggregation threads or multiple statistics threads.

In one illustrative embodiment, some mini-bins are stored on disk 214, and mini-bins are loaded into the mini-bin buffer 203 as needed. Alternatively, all mini-bins may be stored in memory only and updated on the fly.

In one illustrative embodiment, mini-bins are written to disk 214 as soon as they reach the threshold size. Alternatively, incomplete mini-bin can be written to disk 214 after a specified period of time from creation. For example, if data enters the target table infrequently, writing incomplete mini-bins to disk will allow the optimizer 205 to access updated distributions in a more timely fashion.

Optionally, the accrued maximum value on the highest mini-bin and minimum value on the lowest mini-bin, even though not yet part of the data distributions, could be made available to the optimizer 205 immediately for the purpose of generating plans.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for table statistics update in a database management system, comprising:
   in response to a request to modify a row in a target table, inspecting a log record for the modified row in the target table by the database management system;
   determining that the target table is configured for continuous statistics evaluation by the database management system;
   determining whether a mini-bin related to the modified row exists by the database management system, wherein the mini-bin represents data distribution for a portion of rows in the target table;
   in response to determining that the mini-bin related to the modified row does not exist, creating the mini-bin by the database management system;
   in response to determining that the mini-bin related to the modified row exists:
   aggregating the modified row into the mini-bin; and
   when the mini-bin is determined to have reached a threshold size, storing the mini-bin to a disk; and
   consolidating a plurality of mini-bins stored in the disk and corresponding to the target table into a set of bins by the database management system, wherein the set of bins represent data distribution of the target table.

2. The method of claim 1, wherein in response to determining that the target table is configured for continuous statistics evaluation, the method further determines whether the request comprises an insert of the row into the target table or a deletion of the row from the target table.

3. The method of claim 2, wherein when the request comprises the insert of the row into the target table, the aggregating of the modified row into the mini-bin comprises:
   incrementing a number of rows tracked in the mini-bin;

determining whether a column related to the insert comprises a unique constraint;

in response to determining that the column comprises the unique constraint, incrementing a number of unique values tracked in the mini-bin;

when an inserted value is higher than a maximum value tracked in the mini-bin, setting the maximum value tracked to the inserted value; and when the inserted value is lower than a minimum value tracked in the mini-bin, setting the minimum value tracked to the inserted value.

4. The method of claim 2, wherein when the request comprises the insert of the row into the target table, the storing of the mini-bin to the disk comprises storing the mini-bin to a system catalog of the database management system.

5. The method of claim 2, wherein when the request comprises the deletion of the row from the target table, the aggregating of the modified row into the mini-bin comprises:

decrementing a number of rows tracked in the mini-bin;

determining whether a column related to the deletion comprises a unique constraint;

in response to determining that the column comprises the unique constraint, decrementing a number of unique values tracked in the mini-bin;

determining whether a type of the column is integer and values tracked in the mini-bin are contiguous and wholly contained between a minimum value and a maximum value tracked in the mini-bin;

in response to determining that the type of the column is integer and the values tracked in the mini-bin are contiguous and wholly contained between the minimum value and the maximum value tracked in the mini-bin, determining whether a value of the deletion equals the maximum value tracked in the mini-bin or equals the minimum value tracked in the mini-bin;

in response to determining that the value of the deletion equals the maximum value tracked in the mini-bin, decrementing the maximum value tracked in the mini-bin; and in response to determining that the value of the deletion equals the minimum value tracked in the mini-bin, incrementing the minimum value tracked in the mini-bin.

6. The method of claim 2, wherein when the request comprises the deletion of the row from the target table, the method further comprises: when a size of the mini-bin is determined to have reached zero, deleting the mini-bin from a system catalog of the database management system.

7. The method of claim 1, wherein the consolidating of the plurality of mini-bins stored in the disk and corresponding to the target table into the set of bins comprises:

aggregating the plurality of mini-bins into the set of bins; and writing the set of bins to a system catalog of the database management system.

* * * * *